US006484388B1

(12) United States Patent
Amlee et al.

(10) Patent No.: US 6,484,388 B1
(45) Date of Patent: Nov. 26, 2002

(54) SEQUENTIAL ROLL-FORMING PROCESS FOR A STATOR

(75) Inventors: Dale Alan Amlee, Oklahoma City, OK (US); Stephen Alan Alford, Alexandria, IN (US)

(73) Assignee: Delphi Technologies, Inc., Troy, MI (US)

( * ) Notice: Subject to any disclaimer, the term of this patent is extended or adjusted under 35 U.S.C. 154(b) by 111 days.

(21) Appl. No.: 09/636,341

(22) Filed: Aug. 10, 2000

(51) Int. Cl.[7] .................. H02K 15/00; H02K 15/14; H02K 15/16
(52) U.S. Cl. .................. 29/596; 29/598; 29/603.04; 29/603.17; 29/605; 29/606; 72/210; 72/214; 72/224; 310/42; 310/64; 310/214; 310/216; 310/256; 310/258
(58) Field of Search .................. 29/596, 598, 603.04, 29/603.17, 605, 606, 240; 72/210, 214, 224; 310/42, 64, 216, 214, 256, 258, 254

(56) References Cited

U.S. PATENT DOCUMENTS

| | | | | |
|---|---|---|---|---|
| 2,937,408 A | * | 5/1960 | Limpel | |
| 3,710,437 A | * | 1/1973 | Kipple | 29/596 |
| 4,080,724 A | * | 3/1978 | Gillette | 29/598 |
| 4,206,621 A | * | 6/1980 | Kawasaki | 72/130 |
| 4,597,172 A | * | 7/1986 | Bourgeois | 29/736 |
| 4,981,060 A | * | 1/1991 | Knudson | 83/555 |
| 4,982,487 A | * | 1/1991 | Maruko | 29/243.58 |
| 4,995,159 A | * | 2/1991 | Hancock | 29/596 |
| 5,570,603 A | * | 11/1996 | Chatterley | 72/101 |
| 5,592,271 A | * | 1/1997 | Parker | 399/285 |
| 5,592,731 A | * | 1/1997 | Huang | 29/596 |
| 6,304,018 B1 | * | 10/2001 | Ham | 310/216 |

* cited by examiner

Primary Examiner—Peter Vo
Assistant Examiner—Paul D Kim
(74) Attorney, Agent, or Firm—Margaret A. Dobrowitsky

(57) ABSTRACT

A process to perform a flaring operation on a rotating electrical device (stator) designed with a number of these spaced axially oriented splines around its perimeter. The design of the stator requires that these perimeter splines possess a flared outer end, creating a rounded cavity contour between adjacent splines to effectively retaining the stator winding in place. The method of this invention reduces damage to the stator windings and allows more wire fill during the manufacturing process.

7 Claims, 3 Drawing Sheets

SEQUENTIAL ROLL-FORMING PROCESS FOR A STATOR

BACKGROUND OF THE INVENTION

1. Field in the Invention

The present invention relates to stator windings for use in rotating electrical devices and more particularly, to an improved method for forming the stator, particular to a roll forming process to efficiently and effectively form the stator.

2. Discussion of Relevant Art

During the manufacture of rotating electrical devices, lengths of wire, called "conductors", are wound around the stator structure. This winding process usually causes the windings and internal motor leads to be formed through relatively narrow apertures and into wire slots, which can often cause the insulation on the conductors to be damaged. When a rotating electrical device is used in a high temperature and/or in a corrosive environment, the damage caused on the insulation can cause premature failure of the device.

This invention is particularly suited to a stator having splines formed about an outer or inner periphery of the central stator body. For this design, the windings must be threaded between the splines through a narrow gap between each successive spline during the manufacturing process. That operation can cause damage to the windings and lack or wire fill in the slots.

There is a need for improved stator structure and a method of making same which will reduce the manufacturing costs, help wire slot fill, and reduce the likelihood of damage to the insulation of the conductors, and thus eliminate or minimize the risk of resulting failure and improve stator output.

SUMMARY OF INVENTION

The present invention has been contemplated to overcome the foregoing deficiencies and to meet the above-described needs. Specifically, the present invention comprises a stator structure for a rotating electrical device with stator windings formed by conductors coated with insulation. During the manufacture of the stator structure, specifically the stator splines, are formed to improve the manufacturing process and allow more fill, which reduces imperfections and damage to the windings and produces more output.

The device and method of this invention is used to perform a flaring operation on a cylindrical automotive alternator component (stator) designed with a number of evenly spaced axially oriented splined around its inner or outer diameter. The design of the stator requires that these perimeter splines possess a flared end to retain the windings, creating a rounded cavity contour between the adjacent splines. The splines would be put into the cylindrical surface of the stator by means of another process, e.g., a wire EDM process, stamping or cold forming, prior to the winding operation.

To form the flared outer or inner portion according to the invention, the preferred embodiment of the invention uses a series of forming rollers that pass lengthwise along each spline to gradually and sequentially flare out the end surface of the spline. Each roller deforms the material slightly, spreading the material in the circumferential direction, and the successive rollers are designed to make an additional incremental deformation to the same surface so that after passing a number of rollers across the spline the flared geometry is achieved.

Preferably, these rollers are contained within a large carriage, designed to carry the rollers at the correct spacing relative to each other and relative to the component being worked on. Each roller is mounted on suitable bearings to allow it to rotate while being driven against the rotor component. The carriage itself moves in a direction parallel to the axis of the component part, mounted in turn through suitable bearings onto a rigid stationary platform, and powered by a suitable linear motive device such as a hydraulic cylinder.

The stator component to be formed is clamped in place by a supporting clamping mandrel, which supports the stator material against the force of deformation, and also serves to align the splines relative to the position of the rollers. This same clamping mandrel may be indexed rotationally to present successive splines to the same forming action, or the rollers may be formed to contact more than one spline at a time. The result is that with a single stroke of the carriage, a fully formed flare would be created on one or more splines. Successive strokes of the carriage are performed after rotationally indexing the component to the next spline or set of splines, until the entire perimeter of the component is fully formed in this fashion.

The method of this invention thus provides an improved stator design and a method manufacturing a stator that provides a substantially improvement in the reliability, manufacturing costs and stator geometry as compared to known systems and methods.

DETAILED DESCRIPTION OF PREFERRED EMBODIMENT

Figure 1:
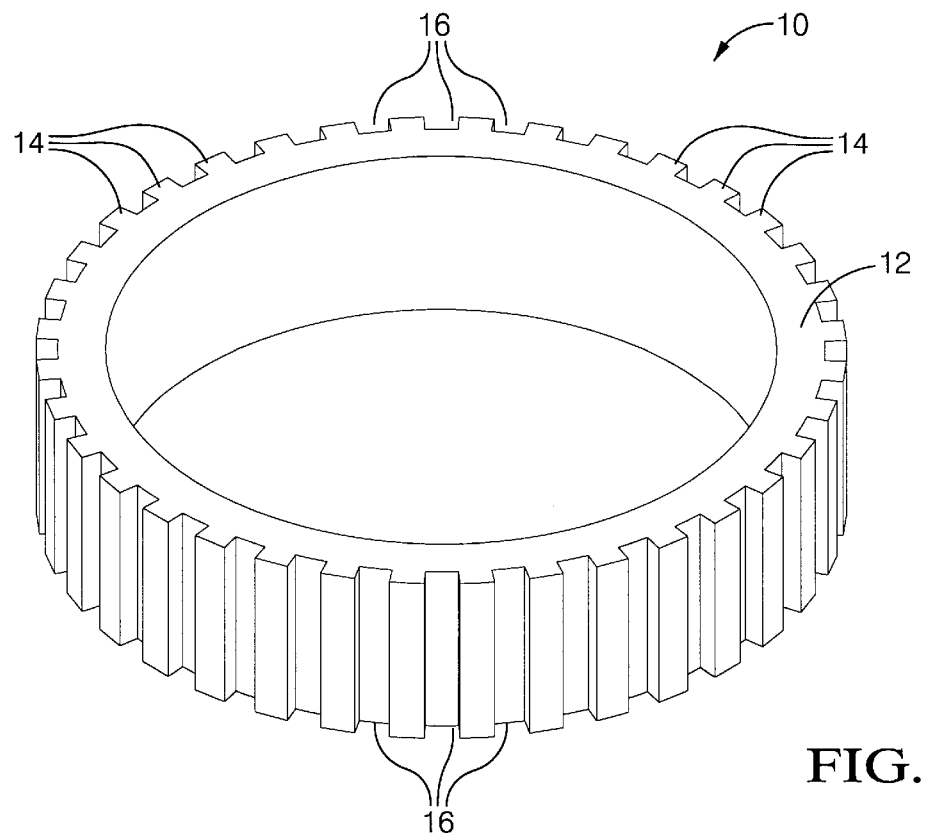
FIG. 1 is a perspective view of a preliminary stator component prior to applying the roll-forming method of this invention.

With reference to the appended drawing figures, the preferred embodiment of the present invention will now be described. FIG. 1 illustrates a raw or pre-formed stator piece 10 that is formed by any know cold forming process, wire EDM process, a punch process, etc. The pre-formed stator piece 10 comprises a stator main body or hub portion 12 and a series of substantially rectangular splines 14 disposed on the inner or outer peripheral surface of the main body portion 10. For the automotive application envisioned by the inventors, each spline 14 would measure several inches in length in the axial direction (along axis 'A') and a fraction of an inch in width in the circumferential direction.

Figures 2A, 2B:
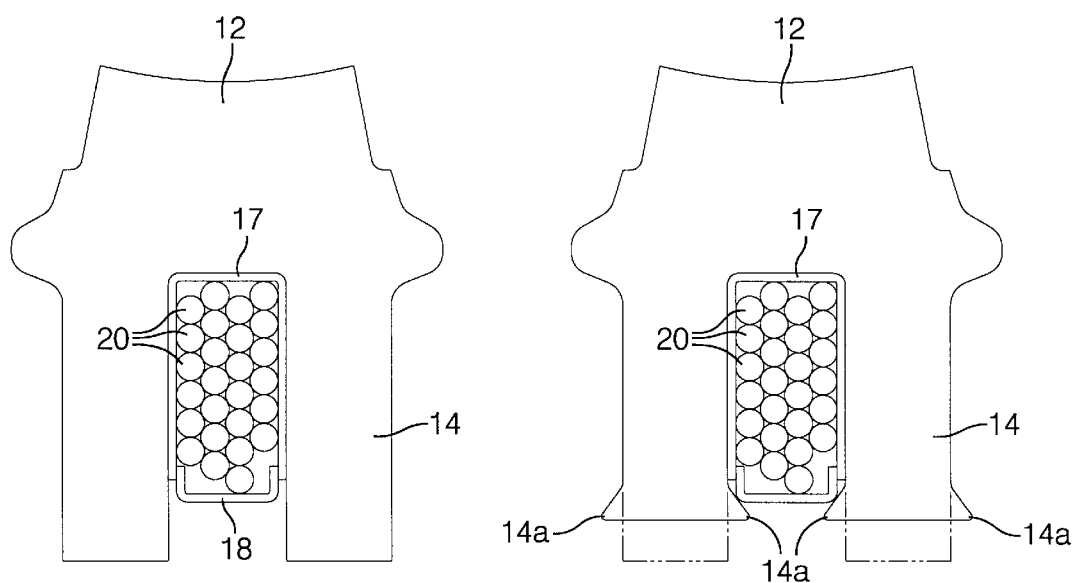
FIG. 2A is a cut-away view of two adjacent splines of the preliminary stator component prior to applying the roll-forming method of this invention.
FIG. 2B is a cut-away view of two adjacent splines of the stator component after applying the roll-forming method of this invention.
Figure 3:
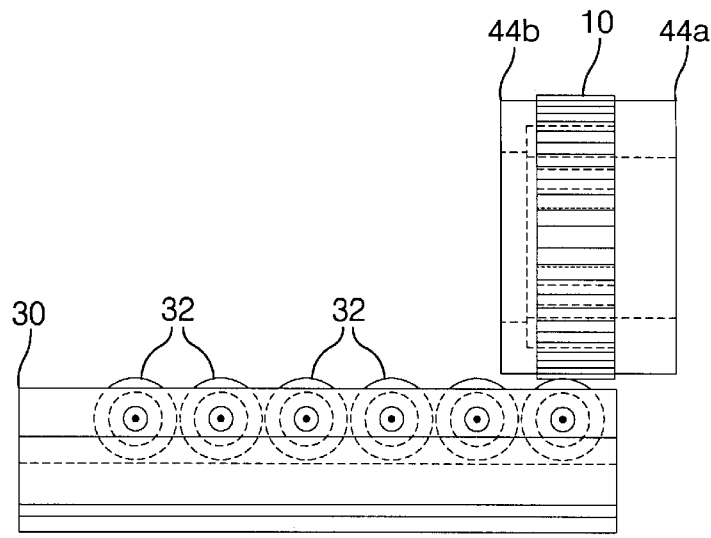
FIG. 3 is a side view showing the roll forming carriage and stator.
Figure 4:
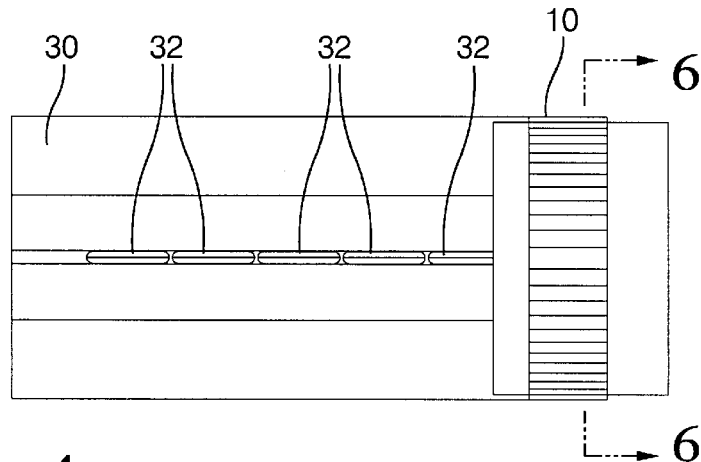
FIG. 4 is a top view of the assembly shown in FIG. 3.
Figure 5:
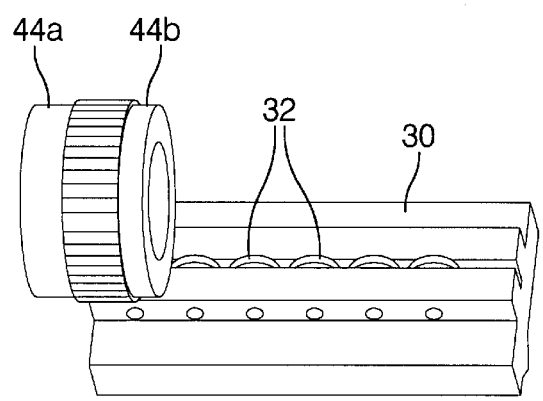
FIG. 5 is a perspective view of the assembly shown in FIG. 3.
Figure 6:
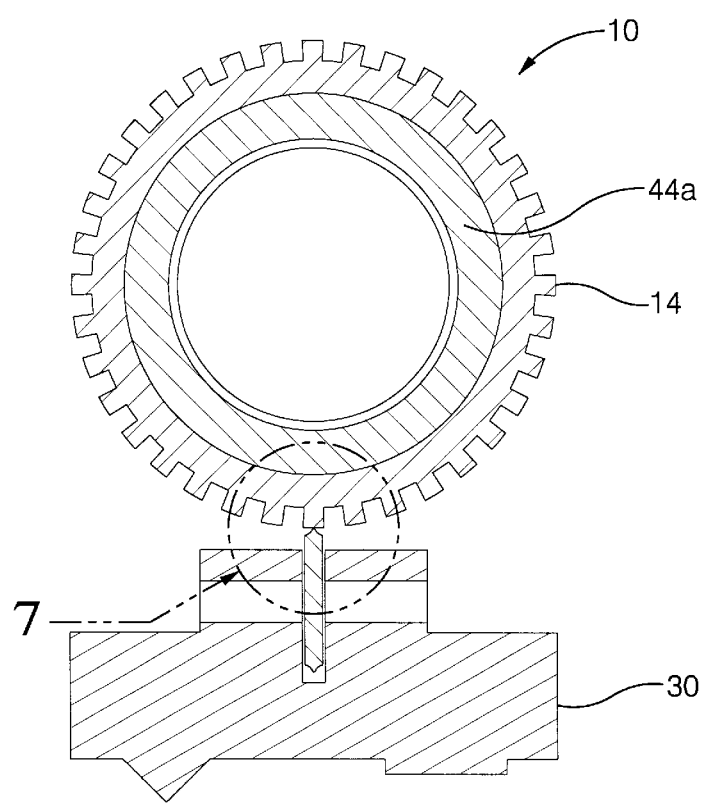
FIG. 6 is a front view of the assembly shown in FIG. 3 taken along the axis line of the stator.

As is known in the art, a rotating electrical device may be formed by wire windings 20 disposed about the splines 14 of the stator 10. Typically, these windings are coated with a protective coating to minimize wire damage during the manufacturing process. In addition, a slot liner 17 is typically disposed within each slot 16 separating each spline 14 in a further attempt to minimize wire damage. The slot liner 17 is illustrated in FIGS. 2A and 2B. Thus, after the pre-formed stator piece 10 is formed by conventional techniques and the slot line 17 is disposed within each slot 16, windings 20 (see FIG. 2A) are disposed about the splines 14 in a known manner. A cap retainer 18 is then placed over the windings in order to retain the windings 20 in place during manufacture and use of the stator.

In order to properly trap and retain the retaining cap 18 and stator windings 20 in place on the stator 10, the present invention provides a roll forming technique that deforms the terminal end of the splines 12 in a manner described below to substantially close-off the slot 16.

Essentially, the present invention is a process by which a series of hardened tool steel rollers can be employed to generate certain geometric features on softer metal parts. In this process, the part to be formed would remain stationary while the rollers move in a linear fashion across the part, thus forming the desired geometry.

The process of the invention works well at room temperature conditions and reduces the risk of damage to the windings.

The device and method of this invention is used to perform a flaring operation on a stator (e.g., a cylindrical automotive alternator component), designed with a number of evenly spaced axially oriented splines 14 around its inner or outer diameter. The design of the stator requires that these perimeter splines 14 possess a flared outer terminal end 14a, creating a rounded cavity contour between the adjacent splines (see FIG. 2B). The splines would be put into the cylindrical surface of the stator by means of a known process, a wire EDM process, a stamping process, a cold forming process, etc. prior to the winding operation.

Figure 7:
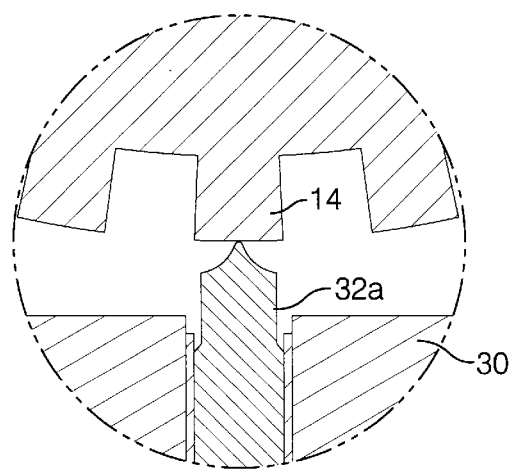
FIGS. 7 and 8 are exploded partial views of the roller impacting upon one spline during the roll-forming process.
Figure 8:
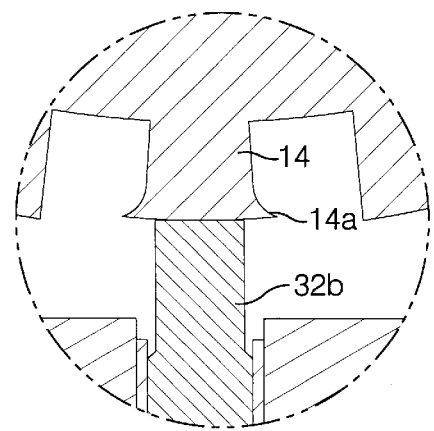

With reference to FIGS. 3–6, this invention provides a process by which a series of hardened tool steel rollers 32 can be employed to generate certain geometric features on softer metal parts. In the preferred embodiment, the part to be formed (pre-formed stator 10) would remain stationary while the rollers 32 moved in a linear fashion across the part, thus forming the geometry. To form the flared outer portion 14a, it is desired to use a series of forming rollers 32 passed lengthwise along each spline 14 to gradually and sequentially flare out the outer surface of the spline 14. Each roller 32 deforms the material slightly, spreading the material in the circumferential direction, and the successive rollers would be designed to make an additional incremental deformation of the same surface so that after passing a number of rollers across the spline the flared geometry would be achieved. To this end, each successive roller is provided with a slightly different contact surface sequentially acting on the terminal end of each spline 14. FIGS. 7 and 8 show that a relatively sharp contact surface may be provided on the first roller 32a (FIG. 7) while a relatively flatter, more blunt contact surface may be provide on a subsequent roller 32b (FIG. 8). As known in the roll-forming art, these different contact surfaces will effectively deform the terminal end of the spline 14 to form the flared-out portion 14a.

In the preferred embodiment, the rollers 32 are contained within a large carriage 30, designed to carry the rollers 32 at the correct spacing relative to each other and relative to the component being worked on (e.g., stator 10). Each roller is preferably mounted on suitable bearings (not shown) to allow it to rotate while it is being driven against the stator component 10. The carriage itself moves in a direction parallel to the axis of the component part 10, mounted in turn onto a rigid stationary platform, and powered by a suitable linear motive device such as a hydraulic cylinder (not shown in drawing).

The stator component 10 to be formed is preferably clamped in place by a supporting clamping mandrel 44a, 44b which would serve to support the rotor material against the force of deformation, and would also serve to align the splines 14 relative to the position of the rollers 32. This same clamping mandrel 44a, 44b would also be indexed rotationally to present successive splines to the same forming action. The result of this would be that with a single stroke of the carriage, a filly formed flare 14a would be created on one spline 14 at a time. Successive strokes of the carriage would be performed after rotationally indexing the component to the next spline located circumferentially adjacent the treated spline 14, until the entire perimeter of the component is fully formed in this fashion. Of course, the invention should not be limited in this regard; the carriage may be designed with a plurality of rollers 32 acting on more than one spline at a time.

It should be noted that while FIGS. 3—8 illustrate the stator component 10 without the windings 20, such illustration is provided in order to clarify the method and structure resulting from this invention. In each view of FIGS. 3 through 8, the windings 20 have been omitted for simplicity sake. FIGS. 2A and 2B present a structural representation of both the stator and windings as envisioned in this invention.

While the present invention has been shown and described with reference to the preferred embodiment and method, it will be understood by those of skill in the art that various changes in form and detail may be made therein without departing from the spirit and scope of the invention.

What is claimed is:

1. A method forming a stator suitable for a rotating electric device including the steps of:

providing a preliminary stator component comprising a stator main body and a plurality of splines radially projecting from an inner or outer circumferential surface of said stator main body;

applying at least one wire winding in a slot defined between two adjacent splines;

roll forming a terminal end of at least said two adjacent splines to effect a deformation process upon said terminal end to thereby create a flared-out portion at said terminal end;

indexing said stator component rotationally to present successive splines to said deformation process.

2. The method according to claim 1, wherein said step of roll forming comprises applying each of said plurality of splines to at least one roller formed of a material having a hardness greater than the hardness of the splines.

3. The method according to claim 2, wherein said at least one roller comprises a series of rollers, and wherein successive rollers of said series of rollers comprises a contact surface having a different shape to apply a varied deformation process to said terminal end at said successive rollers.

4. The method according to claim 3, further comprising a step of retaining said stator component in a stationary position while moving said series of rollers.

5. The method according to claim 1, further comprising the step of retaining said stator component via a clamping mandrel that aligns said rollers with said splines and supports said stator component against a force of deformation during said deformation process.

6. The method according to claim 1, wherein said rollers are rotationally supported within a carriage member.

7. The method according to claim 1, wherein said step of roll forming comprises retaining said stator component in a stationary position while linearly translating at least one roller along said two adjacent splines during said deformation process.

* * * * *